United States Patent [19]

Albright

[11] 3,997,505
[45] Dec. 14, 1976

[54] FLAME RETARDANT POLYMERIC COMPOSITIONS CONTAINING PENTAERYTHRITOL CYCLIC DIPHOSPHATES OR DIPHOSPHORAMIDATES

[75] Inventor: James A. Albright, Ann Arbor, Mich.

[73] Assignee: Michigan Chemical Corporation, Chicago, Ill.

[22] Filed: Nov. 17, 1975

[21] Appl. No.: 632,569

Related U.S. Application Data

[63] Continuation-in-part of Ser. No. 429,606, Jan. 2, 1974, abandoned.

[52] U.S. Cl. .................. 260/45.8 R; 260/45.8 A
[51] Int. Cl.² ........................................ C08K 5/52
[58] Field of Search ............... 260/45.8 R, 2.5 AJ, 260/2.5 FP; 106/15 FP

[56]  References Cited
UNITED STATES PATENTS

| | | | |
|---|---|---|---|
| 3,090,799 | 5/1963 | Wahl et al. | 260/927 R |
| 3,584,085 | 6/1971 | Hartmann | 260/959 |
| 3,810,838 | 5/1974 | Haugen | 260/959 |
| 3,866,405 | 2/1975 | Knopka | 260/47 R |

*Primary Examiner*—V.P. Hoke
*Attorney, Agent, or Firm*—Robert M. Phipps

[57] ABSTRACT

Polymeric compositions comprising a polymer and a flame retarding amount of a compound of the formula

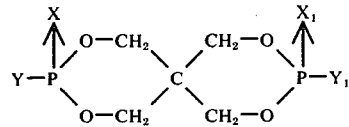

where X and $X_1$ are each oxygen or sulfur and Y and $Y_1$ are each monovalent halogenated oxyaliphatic or oxyalicyclic or

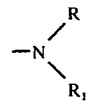

where R and $R_1$ are each hydrogen, monovalent hydrocarbon or halogenated monovalent hydrocarbon, are disclosed. Also disclosed is a process for rendering polymers flame retardant comprising combining said polymers with a flame-retarding amount of one or more of the compounds described above.

79 Claims, No Drawings

FLAME RETARDANT POLYMERIC COMPOSITIONS CONTAINING PENTAERYTHRITOL CYCLIC DIPHOSPHATES OR DIPHOSPHORAMIDATES

RELATED PATENT APPLICATIONS

This application is a continuation-in-part of applicant's prior copending application, Ser. No. 429,606, filed Jan. 2, 1974, now abandoned.

BACKGROUND OF THE INVENTION

Compounds which are useful in polymeric compositions of the present invention can be characterized as pentaerythritol cyclic diphosphates and diphosphoramidates. The diphosphates are further characterized by halogen substitution on the oxyaliphatic or oxyalicyclic groups of the ester moiety. The diphosphoramidates can be optionally substituted with halogen atoms on the hydrocarbon substituents attached to the nitrogen atoms.

During the past several years, a large number of flame retardants have been developed for use with an almost equally large number of flammable materials. Cellulosic materials such as paper and wood and polymeric materials such as synthetic fibers and bulkier plastic articles are just two examples of materials for which flame retardants have been developed. For any class of flammable materials, such as synthetic high polymers, those skilled in the art have long been aware that some flame retardant additives are more effective in polymers and polymeric compositions than other flame retardant additives. This is because the efficacy of any flame retardant in polymers or polymeric compositions is measured not only by the flame retarding capability of the additive but also by the ability of the additive to improve or modify, or at least not to detract from, other physical or mechanical properties of the polymer or polymeric composition. The mere fact, therefore, that most flame retardants contain halogen and phosphorus atoms does not assure that any given halogenated or phosphorus-containing compound will impart useful flame retardant characteristics to all or even to any polymeric systems. Furthermore, as those skilled in the art have improved the flame retardancy of many polymeric materials, they have been simultaneously required to provide the necessary flame retardancy with a minimal effect upon other properties of the polymers such as their light stability, processability and flexural, tensile and impact strengths. Balancing all of the foregoing considerations and thereby developing polymeric compositions with good flame retardant characteristics as well as a satisfactory balance of other properties is, consequently, a task which has in the past and presently continues to require the exercise of a high degree of inventive skill.

SUMMARY OF THE INVENTION

Providing new compounds capable of imparting useful flame retardant characteristics to natural and synthetic polymer systems constitutes one of the principal objects of this invention. Additional objects will become apparent from the following detailed disclosure.

Providing a method for rendering natural and synthetic polymers flame retardant through the addition of certain additives is another principal object of the invention.

The present invention pertains to polymeric compositions comprising a polymer and a flame retarding amount of a compound having the generic formula

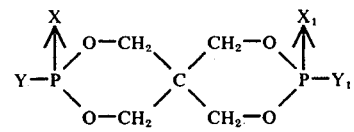

where X and $X_1$ are each oxygen or sulfur and Y and $Y_1$ are each monovalent halogenated oxyaliphatic or oxyalicyclic or

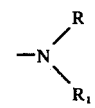

where R and $R_1$ are each hydrogen, monovalent hydrocarbon or halogenated monovalent hydrocarbon.

Another aspect of the invention pertains to a method for rendering polymers flame retardant comprising combining said polymers with a flame retarding amount of one or more of the compounds described above.

DESCRIPTION OF THE PREFERRED EMBODIMENTS

The compounds of the above formula include both the diphosphate esters and the diphosphoramidates of pentaerythritol. The compounds can also be generically described as 3,9-substituted-2,4,8,10-tetraoxa-3,9-diphosphaspiro [5.5] undecane-3,9-dioxide or disulfides.

As indicated by the generic formula, the X groups attached to the phosphorus atoms can be either sulfur or oxygen. Oxygen is the preferred substituent for most compounds included herein, but the presence of thiophosphoryl groups, i.e.

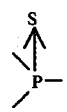

may be advantageous in some situations because of the difference in properties caused by their presence in place of the more customary phosphoryl groups.

The Y groups can be monovalent halogenated oxyaliphatic or oxalicyclic groups or an amino group of the formula

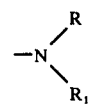

where the R and $R_1$ groups are hydrogen, monovalent hydrocarbon or halogenated monovalent hydrocarbon. The oxyaliphatic and oxyalicyclic groups can be alkoxy, olefinicoxy and cycloalkoxy groups having any number of carbon atoms, preferably not more than about 12 carbon atoms and more preferably not more than about six carbon atoms. The halogen atoms present on the oxyaliphatic and oxyalicyclic groups include fluorine, chlorine, bromine and iodine. Of the foregoing, chlorine and bromine are preferred. The number of halogen substituents is limited only by the number of sites on the aliphatic or alicyclic group available for their substitution. From a practical standpoint, the number of halogen atoms present on aliphatic or alicyclic groups having six or less carbon atoms will usually be from about one to about six. Examples of suitable halogenated monovalent oxyaliphatic or oxyalicyclic groups include bromoethoxy, dibromoethoxy, dibromopropoxy, dibromobutadieneoxy, tribromobutoxy, dichlorocyclohexoxy, dichlorobromocyclohexoxy, chlorodibromopropoxy, chlorodibromoeopentyloxy, difluorochloroethoxy, bromoiodopropoxy, difluorochlorohexoxy, dichlorohexabromoiodohexenoxy, iodethoxy, chloropentabromocyclohexoxy, fluorohexabromobutoxy, tetrafluorocyclobutoxy, diiodobuteneoxy, difluoroallyloxy, dibromodichlorohexeneoxy and the like When the Y groups are oxyaliphatic groups it is preferred that said groups each be

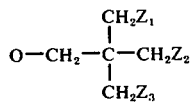

wherein $Z_1$ and $Z_2$ are independently selected from fluorine, chlorine, bromine, iodine, and hydrogen and $Z_3$ is selected from fluorine, chlorine, bromine, and iodine. Examples of suitable groups of the above neopentyloxy structure are listed in Table I, infra. Table I is for purposes of illustration only and is not to be construed as a limitation on the scope of this invention. The following is a partial listing of those preferred compounds which have the above neopentyloxy moiety: 3,9-bis(2,2-[dibromomethyl]-3-bromopropoxy)-2,4,8,10-tetraoxa-3,9-diphosphaspiro [5.5]-undecane-3,9-dioxide, 3,9-bis(2,2-[dichloromethyl]-3-chloropropoxy)-2,4,8,10-tetraoxa-3,9-diphosphaspiro [5.5]undecane-3,9-dioxide, 3,9-bis(2,2-[dimethyl]-3-chloropropoxy)-2,4,8,10-tetraoxa-3,9-diphosphaspiro[5.5]undecane-3,9-dioxide, 3,9-bis(2,2-[dimethyl]-3-bromopropoxy)-2,4,8,10-tetraoxa-3,9-diphosphaspiro [5.5]undecane-3,9-dioxide, and 3,9-bis(2,2-[dibromomethyl]-3-chloropropoxy)-2,-4,8,10-tetraoxa-3,9-diphosphaspiro [5.5]undecane-3,9-dioxide.

TABLE I

| Group | $Z_1$ | $Z_2$ | $Z_3$ |
|---|---|---|---|
| 1 | Br | Br | Br |
| 2 | Cl | Cl | Cl |
| 3 | H | H | Cl |
| 4 | H | H | Br |
| 5 | Br | Cl | Br |

The Y groups can also be amino groups of the formula

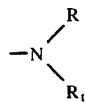

where R and $R_1$ are hydrogen, monovalent hydrocarbon or halogenated monovalent hydrocarbon.

The monovalent hydrocarbon groups can be aliphatic, alicyclic or aromatic and can be of any size, preferably not more than about twelve carbon atoms, more preferably not more than about six carbon atoms. Preferred monovalent hydrocarbon groups are phenyl and alkyl groups having up to about six carbon atoms. The halogen atoms can be fluorine, chlorine, bromine or iodine and preferably are chlorine or bromine. The number of halogen atoms present on the R groups is limited only by the sites on the R groups available for substitution. Preferably, each of the R groups will usually contain a maximum of about six halogens per R group, and more preferably a maximum of about three halogens per R group.

The monovalent hydrocarbon groups are preferably aliphatic, halogenated aliphatic, aromatic, or halogenated aromatic groups containing not more than about 12 carbon atoms, said halogenated groups having up to about six halogen substituents per group.

Examples of suitable amino groups include amino, diethylamino, diphenylamino, propylamino, methylamino, dimethylamino, N-phenyl, N-methylamino, phenylamino, p-tolylamino, bromophenylamino, chloromethylamino, di-(chloroethyl)amino, N-ethyl, N-tribromocyclohexylamino, di-(tribromochloroethyl)amino, di-(dichlorobromoisopropyl)-amino, butadienylamino, di-(fluorocyclopenyl)amino, di(diiodoethyl)-amino and bis(2,3-dibromopropyl)amino.

All of the aforedescribed and aforementioned Y and $Y_1$ groups can be attached to the diphosphoryl or dithiophosphoryl pentaerythritol group, also characterized as 3,9-substituted-2,4,8,10-tetraoxa-3,9-diphosphaspiro [5.5]undecane-3,9-dioxide or disulfide. The numerical designations used in naming the compounds of this invention can be ascertained by reference to the following formula where the numbers of the heterocyclic rings are numbered.

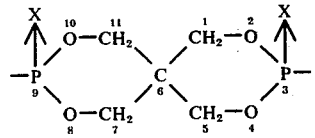

Two representative compounds are 3,9-bis(2,3-dibromopropoxy)-2,4,8,10-tetraoxa-3,9-diphosphaspiro [5.5]undecane-3,9-dioxide and 3,9-bis(N,N-diethylamino)-2,4,8,10-tetraoxa-3,9-diphosphaspiro [5.5]undecane-3,9-dioxide. Two additional representative compounds are the 3,9-disulfide analogs of the above two compounds. Additional 3,9-bis-substituted compounds, formed by placing the aforementioned halogenated oxyaliphatic and oxyalicyclic groups and the optionally halogenated substituted amino groups on the diphosphoryl and dithiophosphoryl pentaerythritol groups, constitute additional examples of compounds within the scope of this invention. The disulfide analogs of the foregoing compounds are further examples.

In addition to the 3,9-bis-substituted compounds, an even larger number of 3,9-substituted compounds where the 3- and 9- substituents are different from each other are also included within the scope of this invention. The substituents can be varied to produce mixed diphosphate esters, mixed diphosphoramidates and combination phosphate - phosphoramidate compounds. Exemplary combinations of 3- and 9- substituents include dibromoethoxy and tribromochlorobutoxy; dibromopropoxy and dibromochloroneopentyloxy; diethylamino and phenylamino; diphenylamino and tribromoethylamino; di-(bromophenyl)amino and dibromopropoxy; bromoethylamino and dibromochlorobutoxy; diethylamino and dibromopropoxy; and unsubstituted amino and diiodoisopropoxy.

The compounds of the present invention can be prepared by reacting a 3,9-dihalo-2,4,8,10-tetraoxa-3,9-diphosphaspiro [5.5]-undecane-3,9-dioxide or disulfide with an alcohol or an amine to yield the appropriate diphosphate ester or diphosphoramidate. The equation for the reaction is:

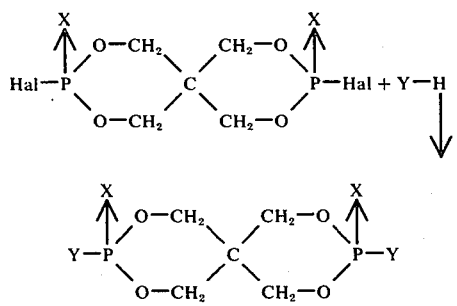

where Y has the meaning set forth above in the description of the compounds and where Hal indicates a halogen atom. As an alternative reactant for the alcohol or amine, the metal salts of the alcohol or amine can be used. If it is desired that the two Y groups be different from each other, two different Y—H reactants should be employed. The reaction can be carried out by simply mixing the halophosphate and the alcohol or amine reactants together and heating the mixture gently for a period of time. The conditions of reaction will vary widely depending upon the reactants, but heating the reactants under gentle refluxing conditions for a period of time of up to three or four hours is acceptable for preparing many of the compounds of this invention. Catalytic quantities of a metal salt or oxide such as magnesium oxide, magnesium chloride, calcium oxide, calcium chloride, titanium chloride or vanadium acetate, or stoichiometric quantities of a weak organic base such as pyridine or triethylamine, can be used to accelerate the completion of the reaction. The halophosphate starting reactant can be prepared by reacting pentaerythritol with phosphorus oxyhalide.

Compounds of the present invention are useful as flame retardants in polymeric compositions. Polymers applicable to the present invention can be any of the natural or synthetic polymers. Naturally occurring polymers include cellulosic polymers such as cellulose, cellulose acetate and cellulose triacetate, natural rubber and animal proteinaceous substances such as leather and casein. Synthetic polymers useful herein include the thermoplastic and thermosetting polymers. Examples of suitable polymers include the polyamides such as nylon 6, nylon 11, nylon 6,6 and nylon 6,10; the polyolefins such as polyethylene of both the low-and high-density types, polypropylene and poly(4-methylpentene-1); acrylic polymers such as poly(acrylonitrile), poly(ethyl acrylate) and poly(methyl methacrylate); vinyl polymers such as poly(vinyl chloride) and poly(vinyl acetate); styrene polymers such as polystyrene including both crystalline and high-impact types, and styrene copolymers such as poly(styrene-butadiene) and acrylonitrile-butadiene-styrene polymer; acetal polymers such as poly(formaldehyde); polyesters of both the saturated and unsaturated variety; polyethers such as polyethylene glycol, polybutylene glycol and chlorinated polyethers; polycarbonates; amino resins; polysulfones; polyurethanes; silicone polymers such as polydimethylsiloxane, fluorosilicones and silicone rubbers; phenolic resins such as phenol-formaldehyde and cresolfurfural resins; polyphenylene oxides such as poly(2,6-dimethylphenylene oxide); melamine resins such as melamine-formaldehyde polymer; epoxy resins such as the reaction product of epichlorohydrin with bisphenol-A and epoxy novolak polymers and p-aminophenol epoxies; furane resins such as poly(furfuryl alcohol); allyl resins such as poly(diallyl phthalate), poly(diallyl isophthalate) and poly(diallyl maleate); fluoroplastics such as polytetrafluoroethylene, poly(chlorotrifluoroethylene), polyvinylidene fluoride and fluorinated ethylene-propylene polymers; polybutadiene rubbers; and a number of specialty resins such as polyethylene ionomers and polyallomer copolymers. In addition to the above-mentioned polymer systems, a much larger number of copolymers and polymer blends are also included within the scope of the present invention.

Among the many combinations of polymer and flame retardants within the scope of this invention, there are a number of preferred combinations. The phosphoramidates and phosphate esters described herein are particularly useful in polyurethane, polystyrenes, polyesters of both the thermosetting and thermoplastic type, polyolefins, poly(acrylic esters) and acrylonitrile-butadiene-styrene copolymers. Of the foregoing polymers, polyurethanes and polystyrenes are the polymers most preferred for modification with the phosphoramidates of this invention. The phosphate ester flame retardants described hereinabove are especially useful in acrylonitrile-butadiene-styrene copolymers, polystyrene and polyesters.

In addition to being among the preferred flame retardants for polymeric compositions, phosphate esters containing the neopentyloxy moiety are especially desirable flame retardants for polyolefins, including, among others, polypropylene, polyethylene and polypropylene-polyethylene copolymers, polystyrene including both the crystalline and high-impact types, acrylonitrile-butadiene-styrene polymers, polyesters of both the saturated and unsaturated variety, Including, among others, polybutylene terephthalate, polyurethanes, including foamed polyurethane cellulosic polymer, and cellulosic polymeric polyester blends. Further, 3,9-bis(2,2-[dibromomethyl]-3-chloropropoxy)-2,4,8,10-tetraoxa-3,9-diphosphaspiro-[5.5]undecane-3,9-dioxide and 3,9-bis(2,2-[dibromomethyl]-3-bromopropoxy)-2,4,8,10-tetraoxa-3,9-diphosphaspiro[5.5]undecane-3,9-dioxide are excellent flame retardants for polypropylene with 3,9-bis(2,2-[dibromomethyl]-3-bromopropoxy)-2,4,8,10-tetraoxa-3,9-diphosphaspiro[5.5]undecane-3,9-dioxide also being an excellent flame retardant for polybutylene terphthalate.

The flame retardant additives mentioned herein can also be used in polymers and polymeric compositions which are further modified through the use of other additives such as fillers, fibers, pigments, dyes, plasticizers, stabilizers, antioxidants and the like.

The polymers which are rendered flame retardant through the use of the flame retardant compounds described herein can be in any form or configuration such as fibers, filaments, films, sheets, pellets, powder, foams and finished articles. Polyurethane and polystyrene foams constitute two of the preferred polymer configurations for improvement of flame resistance by the practice of this invention. The use of the phosphoramidates described above, particularly the non-halogenated phosphoramidates, with polyurethane and polystyrene foams constitutes one of the preferred embodiments of this invention. Use of the phosphoramidates, both halogenated and non-halogenated, with unfoamed polyurethane and polystyrene, constitutes another particularly preferred embodiment.

The amount of flame retardant which is used in the compositions and in the methods of this invention is that amount necessary to produce measurable flame retardancy in the compositions which are so modified. Depending upon the particular compound and the particular polymer with which it is combined, the quantity of flame retardant employed in the compositions and methods of this invention can be of any amount up to about 50 percent or more by weight of the total composition. For most compositions, the flame retardant will comprise from about one to about 25 percent by weight of the total composition.

In addition to the flame-retardant phosphates and phosphoramidates described above, the flame retardancy of a polymer can be further enhanced through the use of so-called "synergists" which enhance the flame retardant effectiveness of the phosphates and phosphoramidates. Effective synergists include certain metal oxides and salts such as oxides and salts of antimony, arsenic, bismuth, tin and zinc. Examples of compounds useful herein are antimony oxide, antimony chloride, antimony bromide, antimony iodide, antimony oxychloride, arsenic trioxide, arsenic pentoxide, zinc sulfate, zinc oxide, zinc borate, stannous oxide and the like. A preferred synergist is antimony oxide. The amount of synergist can, like the flame retardant phosphates and phosphoramidates described above, be used in any amount, taking into account the effect that large amounts of the material may have upon the properties of the polymeric composition. Customarily, the synergist can be employed in concentrations as high as 50% by weight of the total composition, preferably from about 1 to 15%, and more preferably from about 2 to 10%., by weight of the total composition. One level of synergist which is often used is an amount which is from about 25 to about 75%, preferably from about 33 to 67%, by weight of the flame retardant phosphates or phosphoramidates described above.

The flame retardants can be incorporated into the polymer during the polymerization of the monomeric reactants as long as care is taken to minimize any adverse side reactions between the flame retardant and any of the other constituents of the reaction mixture. Alternatively, the flame retardant can be mixed with dissolved, powdered or pelleted polymer prior to molding, thereby providing after molding a finished polymeric article with the flame retardant intimately mixed throughout. Suitable mixing methods include mill rolling and dry mixing in machinery such as a Banbury mixer or the like. Adding flame retardant to a solution or dispersion of the polymer is also acceptable. A third method for combining polymer and flame retardant additive comprises a topical application of the additive to the polymer in its finished form. As an example, a textile filament, fiber, yarn or the like can be passed through a solution, suspension or dry powder of the additive, which is deposited on the polymer as it passes through the medium containing the flame retardant. Instead of a textile fiber, the polymer can be in any finished shape as long as it can somehow be immersed or sprayed or otherwise surface-coated with the flame retardant medium. To aid the polymer in picking up a sufficient quantity of the flame retardant, the surface of the polymer can be pre-treated with a substance which will render the polymer more receptive to the flame retardant. After the topical application, the polymeric article can be subjected to a post-treatment which results in the flame retardant additive being firmly adhered to the surface of the polymer. Suitable post-treatments can include the application of heat, pressure or both to the polymeric article, or a subsequent coating of the flame retardant-treated article with a binder to adhere the flame retardant firmly to the polymer.

The following examples are provided for the purpose of further illustration only and are not intended to be limitations on the disclosed invention. Unless otherwise specified, all temperatures are expressed in degrees centigrade; all weights are expressed in grams; and all volumes are expressed in millimeters.

EXAMPLE 1

A quantity of 29.7 grams of 3,9-dichloro-2,4,8,10-tetraoxa-3,9-diphosphaspiro[5.5]undecane-3,9-dioxide, 43.6 grams of 2,3-dibromopropanol and 0.1 gram of magnesium oxide were mixed together and heated to 110° C. to drive off the hydrogen chloride as it evolved. Hydrogen chloride evolution stopped after about two hours, at which time the reaction mixture was permitted to cool to room temperature. The resultant viscous product was washed with ammonium hydroxide at 60° C. and then with water. The light brown viscous liquid was dried under vacuum. Percent bromine calculated for 3,9-bis(2,3-dibromopropoxy)-2,4,8,10-tetraoxa-3,9-diphosphaspiro[5.5]undecane-3,9-dioxide is 48.5%. Percent bromine found by elemental analysis was 47.7%.

EXAMPLE 2

Dibromopentaerythritol cyclic chlorophosphite,

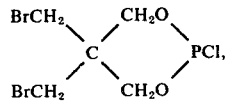

was prepared by reacting dibromopentaerythritol with a slight molar excess of phosphorus trichloride.

The above chlorophosphite, 380 grams, was then reacted with a slight molar excess of gaseous chlorine, 95 grams, in the presence of 200 ml. of methylene dichloride. An ice bath was used during the chlorine addition to hold the reaction temperature to 25° to 30° C. After the chlorine addition was complete, the methylene dichloride was evaporated, leaving the product, 2,2-di-(bromomethyl)-3-chloropropyl dichlorophosphate,

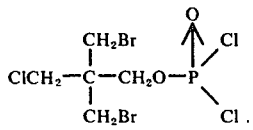

A quantity of 279 grams (0.7 mole) of the above dichlorophosphate was mixed with 47.7 grams (0.35 mole) of pentaerythritol in the presence of 300 ml of toluene and 0.5 gram of magnesium oxide. The reaction mixture was heated to reflux temperature to remove hydrogen chloride. After about 12 hours at reflux temperature, the mixture was allowed to cool and was subjected to vacuum to remove additional hydrogen chloride. The white precipitate was filtered and washed once with ammonium hydroxide and twice with water, and then crystallized from methanol. The produce was identified as 3,9-bis(2,2-di-bromomethyl-3-chloropropoxy)-2,4,8,10-tetraoxa-3,9-diphosphaspiro[5.5]undecane-3,9-dioxide. Melting point was 212° C. Calculated halogen content is Br, 40.7%; Cl, 8.93%; found Br, 41.1%; Cl, 9.12%.

EXAMPLE 3

To a suspension of 29.7 grams (0.1 mole) of 3,9-dichloro-2,4,8,10-tetraoxa-3,9-diphosphaspiro[5.5]undecane-3,9-dioxide in 250 ml. of benzene was added 30 grams of diethylamine in 50 ml. of benzene. The mixture was heated to reflux temperature for three hours and then filtered to remove the precipitated amine hydrochloride. Upon evaporation of the benzene, a clear oil remained which crystallized upon cooling, and was subsequently recrystallized from water. Melting point of the white crystalline product was 189.5° to 190.5° C. Calculated elemental analysis for 3,9-bis(N,N-diethylamino)-2,4,8,10-tetraoxa-3,9-diphosphaspiro-[5.5]undecane-3,9-dioxide was C, 42.2%; H, 7.6%; N, 7.6%. Found C, 41.1%; H, 7.5%; N, 7.2%.

EXAMPLE 4

To 122 grams of the chlorophosphate of Example 3 in 800 ml. of toluene was added 146 grams of p-bromoaniline and 82 grams of triethylamine. The mixture was heated to 95° C. for four hours and then allowed to cool. Two layers formed and the toluene was decanted. The product layer was washed with 800 ml. of water and then with boiling acetone to yield a white solid with a melting point of 276° to 278° C. Bromine content calculated for 3,9-bis-(N-p-bromophenylamino)-2,4,8,10-tetraoxa-3,9-diphosphaspiro[5.5]-undecane-3,9-dioxide was 28.2%. Bromine content found was 30.0%.

EXAMPLE 5

Preparation of 3,9-bis(2,2-[dimethyl]-3-chloropropoxy)-2,4,8,10-tetraoxa-3,9-diphosphaspiro[5.5]undecane-3,9-dioxide.

A quantity of 2,2-dimethyl-3-chloropropyl dichlorophosphate (748.2 gm; 3 moles) was dissolved in 800 ml. of toluene. To the above was added 209 gm (1.5 moles) of pentaerythritol and 3 gm of magnesium oxide. The solution was refluxed at 110° C. for 9 hours. The mixture was filtered leaving a white solid. This material was washed with 1 liter of acetone, followed by a wash with an aqueous ammonia solution having a pH of from about 8 to about 9. This solution was filtered and washed with 2 liters of water followed by a final acetone wash of 1 liter. The material was dried in a forced air oven at 105° C. for 3½ hours. About 442 gm of material was recovered giving a yield of about 63%. The melting point of the compound was determined to be 282° to 285° C.

EXAMPLE 6

Preparation of 3,9-bis(2,2-[dibromomethyl]-3-bromopropoxy)-2,4,8,10-tetraoxa-3,9-diphosphaspiro[5.5]undecane-3,9-dioxide.

A quantity of phosphoryl chloride (50 gm) and 0.4 gm of magnesium oxide were heated to 85° C. Tribromoneopentyl alcohol (300 gm; 0.924 moles) was added in increments over a 1.25 hour period. The reaction continued at a temperature of 85° C. for 6 hours. The excess phosphoryl chloride was distilled under an aspirator vacuum to a pot temperature of 130° C. The reaction was cooled to 100° C. and 0.462 mole (62.8 gm) of pentaerythritol and 300 ml of toluene were added. Additional toluene was added as needed. The system was refluxed for 6½ hours, cooled to room temperature, filtered, and dried at 100° C. in a vented oven.

The residue was washed with about 1 liter of water. An aqueous ammonia solution was added to give a pH of about 8. The residue was then washed with water and then with acetone and finally dried at 100° C. in air vented oven. Yield: 335 gm (83%); Melting point: 225° to 228° C.

EXAMPLE 7

Preparation of 3,9-bis(2,2-[dichloromethyl]-3-chloropropoxy)-2,4,8,10-tetraoxa-3,9-diphosphaspiro[5.5]undecane-3,9-dioxide.

About 1 mole of 2,2-dichloromethyl-3-chloropropyl dichlorophosphate was placed into a 3 liter flask. To this was added 1 gm of magnesium oxide, 2 liters of toluene, and 0.5 mole of pentaerythritol. The reaction was stirred and heated at reflux until the acid number was less than 10. The toluene was stripped off and the solid portion was placed in an oven and dried without being washed. The product was ground up after having been dried for 4 hours at 110° C. and washed with a 50/50 acetone/water solution. The resulting product had a melting point of 197° to 200° C. and the melt remained clear until decomposition was reached at 270° to 280° C.

EXAMPLE 8

The following compounds were synthesized:

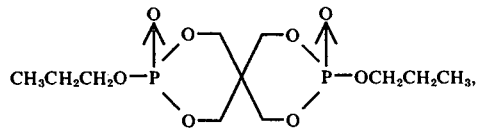

(hereinafter referred to as "A"),

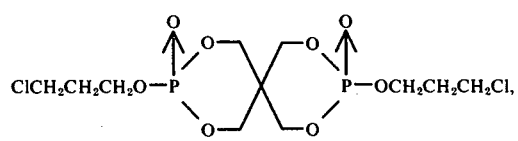

(hereinafter referred to as "B"),

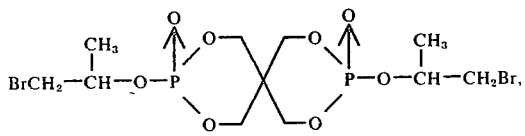

(hereinafter referred to as "C"),

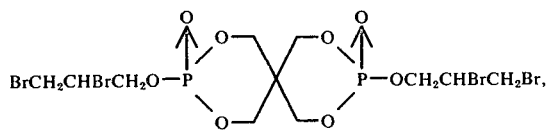

(hereinafter referred to as "D"), and

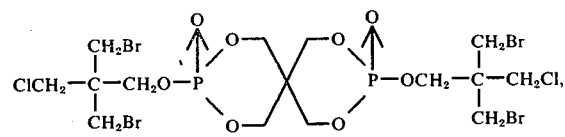

(hereinafter referred to as "E").

Compound D above was synthesized according to Example 1, supra. Compound E above was synthesized according to Example 2, supra. Compounds A, B, and C above were syntheiszed by the general method disclosed to Example 3 of U.S. Pat. No. 3,090,799 (hereinafter referred to as Wahl et al.) and said compounds were identified by nuclear magnetic resonance (NMR) spectroscopy and were found by said technique to have a purity of greater than 95%.

Compounds A, B, C and D above are representative of compounds outside the invention as claimed herein but within the scope of Wahl et al. Compound E is representative of the pentaerythritol cyclic diphosphates of the presently claimed invention.

EXAMPLE 9

The hydrolytic stability of the above synthesized compounds of Example 8 were determined by the following procedure: A magnetically stirred emulsion containing 4 grams of Compounds A, B, C, D, or E, above, 1 gram of Emcol AM2-10C emulsifier (Emcol AM2-10C emulsifier is a mixture of free acid of phosphated nonionic plus nonionic; Emcol AM2-10C is a trademark of Witco Chemical Corporation, New York, New York), and 45 grams of water was heated at 100° C. for 44 hours. The acid number of the emulsion was then determined by titration with a standard potassium hydroxide solution and the results are tabulated in Table II, infra.

TABLE II

| | Hydrolytic Stability Tests | |
|---|---|---|
| Compound | Acid No. (mgKOH/g Sample) | Compound/E × 100%[1] |
| A | 21.6 | 911 |
| B | 19.3 | 814 |
| C | 23.4 | 987 |
| D | 9.45 | 399 |
| E | 2.37 | — |

[1] Percent decrease in hydrolytic stability of prior art compound when compared to the pentaerythritol cyclic disphosphates of the presently claimed invention as represented by Compound E.

A compound's acid number is inversely proportional to the hydrolytic stability to that compound, i.e., the larger a compound's acid number, the poorer will be said compound's hydrolytic stability.

EXAMPLE 10

The thermal stability of compounds A, B, C, D, and E, above, as well as 3,9-bis(2,2-dimethyl]-3-chloropropoxy-2,4,8,10-tetraoxa-3,9-diphosphaspiro [5.5]undecane-3,9-dioxide (prepared in Example 5, supra, and hereinafter referred to as "F"), 3,9-bis-(2,2-[dibromomethyl]-3-bromopropoxy)-2,4,8,10-tetraoxa-3,9-diphosphaspiro [5,5]undecane-3,9-dioxide (prepared in Example 6, supra, and hereinafter referred to as "G"), and 3,9-bis(2,2-[dichloromethyl]-3-chloropropoxy)-2,4,8,10-tetraoxa-3,9-diphosphaspiro-[5.5]undecane-3,9-dioxide (prepared in Example 7, supra, and hereinafter referred to as "H") was determined by the procedure set forth in Section 9-951, "Thermogravimetric Analyzer", of "Instruction Manual 990, Thermal Analyzer and Modules", E. I. Du Pont De Nemours and Co. (Inc.), Instrument Products Division, Wilmington, Delaware 19898. The results of the thermogravimetric analyses (TGA) of the eight compounds at several different weight losses are tabulated in Table III below:

TABLE III

| | TGA Results | | | | | | | |
|---|---|---|---|---|---|---|---|---|
| | Temperature at which Weight Change Occurs, ° C. | | | | | | | |
| Compound | A | B | C | D | E | F | G | H |
| Initial Weight Loss | 45 | 100 | 70 | 100 | 241 | 270 | 180 | 240 |
| 5% Weight Loss | 130 | 172 | 145 | 180 | 258 | 302 | 290 | 317 |
| 10% Weight Loss | 158 | 203 | 218 | 204 | 286 | 305 | 313 | 338 |
| 25% Weight Loss | 225 | 242 | 250 | 224 | 310 | 307 | 335 | 370 |
| 50% Weight Loss | 347 | 300 | 278 | 260 | 331 | 344 | 355 | 390 |

Table III clearly indicates that compounds E, F, G, and H have unobviously superior thermal stability when compared to close prior art compounds.

The superior thermal and hydrolytic stability of the compounds within the scope of the invention as claimed has significant commercial implications. The superior hydrolytic stability of the compounds within the above narrow subgroup enables said compounds to be superior flame retardants when applied via an aqueous system because the surrounding aqueous environment would not cause said compounds to break apart as readily as would the close prior art compounds of Wahl et al.; for the same reasons, the compounds within the narrow subgroup are also superior flame retardants for incorporation into articles of manufacture which have a contemplated use wherein said articles would be subject to exposure to moisture.

The superior thermal stability of the compounds within the above narrow subgroup enables said compounds to be processed without significant weight losses at temperatures wherein close prior art compounds within Wahl et al. exhibit substantial weight losses such that said prior art compounds are not commercially capable of being used. For example, polypropylene is typically processed at 204° C. and molded at 232° C. Since compounds A, B, C and D lose at least 10% of their weight before the molding temperature of polypropylene, these materials cannot be used effectively as flame retardants for polypropylene. In contrast, compounds E and G possess excellent thermal stability and are effective flame retardants for polypropylene as the following Example 11 indicates.

EXAMPLE 11

The flame retardant and Pro-fax 6823 polypropylene base resin was compounded using a C. W. Brabender Prep-Center fitted with a high shear compounding mixer. (Pro-fax 6823 is a trade mark of Hercules Incorporated, 910 Market Street, Wilmington, Delaware 19899.) The flame retardant additive was dry blended with the polypropylene. Since the capacity of the mixing bowl was only 300 grams, a dip technique for compounding was utilized which consisted of fluxing 300 grams of the dry blend mixture and the removal of approximately 200 grams of the fluxed mixture followed by the addition of more of the dry blend mixture until the total dry blend had been compounded. Each charge was compounded under the same conditions: 400° F. temperature, 120 rmp, with 2 to 3 minute compounding time.

Each flame retarded system was then let down to the desired level by dry blending the ground concentrate and the base resin. The base resin and flame retarded systems were injection molded using a Newbury 30 Ton Injection Molding machine. The following is a set of standard injection molding conditions by which all of the systems were injection molded:
 Rear Zone: 410° F.
 Front Zone: 440° F.
 Nozzle: 60° F.
 Injection Speed: 4 to 5 seconds
 Cycle Time: 60 seconds
 Mold Temperature: ~30° C.
 Flow Mold Time: 1 to 2 seconds The above prepared resins were subjected to various tests and the data derived from said tests are reported in Table IV, infra.

TABLE IV

| Flame Retardant | Flame Retardant Testing in Pro-fax 6823 Polypropylene | | |
|---|---|---|---|
| | Level F.R. (phr) | O.I.[2] | UL-94[1] |
| None | — | 17.0 | HB |
| E | 12.5 | 25.5 | V-O |
| E | 15.0 | 23.5 | V-O |
| G | 9.0 | 26.5 | V-O |
| G | 12.5 | 27.5 | V-O |
| G | 18.0 | 24.0 | V-O |

[1]UL-94 Flammability Test at a specimen thickness of ⅛ inch, Underwriters' Laboratories, Inc.
[2]Oxygen Index, ASTM D-2863-70.

The difference in thermal stability is not obvious and is the difference between a material which can be used effectively, as the above Example 11 clearly demonstrates, and one which cannot be effectively used because of poor thermal stability in molding and other processing procedures requiring the exposure of said material to elevated temperatures.

EXAMPLE 12

The following compounds were synthesized:

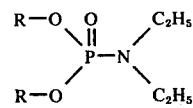

(hereinafter referred to as "X"),

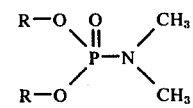

(hereinafter referred to as "Y"),

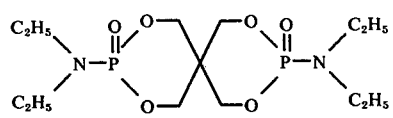

(hereinafter referred to as "Z"), as well as compounds A (see Example 8) and D (see Example 8). Each R above is independently selected from the group containing 80% 1-bromo-2-propyl and 20% 2-bromopropyl. Compounds A and D were synthesized as noted in Example 8. Compound Z was synthesized according to Example 3 and was found to have 41.1% carbon, 7.5% hydrogen, and 7.2% nitrogen by elemental analysis (calculated content is 42.4% carbon, 7.6% hydrogen, and 7.6% nitrogen).

Compounds X and Y were synthesized as follows: To a mixture of 61.3 weight parts of phosphoryl chloride and 0.1 weight parts of anhydrous magnesium oxide was added 111.3 weight parts of bromopropanol mixture consisting of 1-bromo-2-propanol (80%) and 2-bromopropanol (20.0%) over a two hour period. The mixture was heated gradually to 80° to 85° C. and held at that temperature for six hours until no further hydrogen chloride evolution was observed. This bis(bromopropyl)chlorophosphate product was used in the following procedures without further purification.

Synthesis of Compound X: Bis(bromopropyl)chlorophosphate (256 grams) was dissolved in 750 ml of methylene chloride and 104 grams of diethylamine was added dropwise with mechanical stirring while keeping the temperature of the solution below 30° C. After stirring at room temperature for one hour, the solution was extracted with water, dilute hydrochloric acid, and water, and then dried over magnesium sulfate. The methylene chloride was evaporated off. Yield: 218 grams; calculated bromine content: 40.5%; bromine content found by elemental analysis was 38.53%; acid number found was 1.61.

Synthesis of Compound Y: Bis(bromopropyl)chlorophosphate (305 grams) was dissolved in 300 ml of benzene and 80 grams of dimethyl amine was added dropwise with cooling over a two-hour period. The reaction mixture was stirred at room temperature for three hours and the precipitated dimethyl amine hydrochloride was filtered off. The benzene was evaporated. The product was washed three times with 300 ml of water and dried at 80° C. per minute for one half hour. Yield: 145 grams; calculated bromine content is 43.5%; bromine content found by elemental analysis was 48.21%.

Compounds X and Y are representative of compounds having amino substituents similar to those disclosed in U.S. Pat. No. 3,810,838 (hereinafter referred to as Haugen), U.S. Pat. No. 3,584,085 (hereinafter referred to as Hartman) and U.S. Pat. No. 3,645,971 (hereinafter referred to as Hindersinn) yet outside the scope of those references but said substituents being structurally closer to the amino substituents of the pentaerythritol cyclic diphosphoramidate of this invention. Compounds A, supra, and D, supra, are representative of compounds within the scope of Wahl et al.

EXAMPLE 13

The thermal stability of compounds A, D, X, Y and Z prepared above, was determined by the same procedure set forth in Example 10. The results of the thermogravimetric analyses (TGA) of the five compounds at several different weight losses are tabulated in Table V.

TABLE V

| | TGA Results Temperature at which Weight Change Occurs, °C. | | | | |
|---|---|---|---|---|---|
| Compound | A | D | X | Y | Z |
| Initial Weight Loss | 45 | 100 | 35 | 110 | 239 |
| 5% Weight Loss | 130 | 180 | 72 | 142 | 245 |
| 10% Weight Loss | 158 | 204 | 110 | 147 | 252 |
| 25% Weight Loss | 225 | 224 | 183 | 174 | 269 |
| 50% Weight Loss | 347 | 260 | 215 | 195 | 296 |

Table V clearly indicates that Compound Z has unobviously superior thermal stability than would be predicted from the thermal stability of prior art compounds.

The superior thermal stability of Compound Z and compounds within the scope of the pentaerythritol cyclic diphosphoramidates of this invention has significant implications. The superior thermal stability of the compounds within the above narrow subgroup enables said compounds to be processed into polymeric compositions without significant weight losses at temperatures wherein the prior art compounds within Wahl et al., Hartman, and Hindersinn exhibit substantial weight losses such that said prior art compounds are not commercially capable of being used and therefore not commercially practical flame retardants for such polymeric compositions.

EXAMPLE 14

To 150 grams of a general purpose unsaturated polyester prepolymer (Koppers 1010-5) was added 9.6 grams of antimony oxide, 40.2 grams of 3,9-bis(2,2-dibromomethyl-3-chloropropoxy)-2,4,8,10-tetraoxa-3,9-diphosphaspiro[5.5]undecane-3,9-dioxide, 0.5 grams of cobalt naphthenate and 1 gram of methyl ethyl ketone peroxide. The resultant mixture was poured over three layers of random glass mat and allowed to cure at room temperature. The polyester-glass laminate produced thereby contained a total of 24% by weight glass fiber. The amount of the diphosphate ester of pentaerythritol was 27 parts per hundred parts of resin. The antimony oxide present was equal to 6.4 parts per hundred parts of resin.

The composition was tested to measure its flame retardancy and the test results were compared with flame retardancy measurements made on the same polyester without the flame retardant additive and antimony oxide. For further comparative purposes, the flame retardancy of the same polyester modified with 10 parts per 100 parts of resin of a commercially available flame retardant commonly used with polyesters, tris(2,3-dibromopropyl)phosphate, is also measured. Results are reported in Table VI below.

EXAMPLE 15

To 209 grams of the same polyester prepolymer used in Example 14 was added 21 grams of 3,9-bis(N,N-diethylamino)-2,4,8,-10-tetraoxa-3,9-diphosphaspiro[5.5]undecane-3,9-dioxide, 0.5 grams of cobalt naphthenate and 1 gram of methyl ethyl ketone peroxide. A glass fiber laminate was prepared as in Example 14 to provide a polymeric composition containing 22% by weight glass fiber. The flame retardant additive was present in a concentration of 10 parts per hundred parts of resin.

The composition was tested to measure its flame retardancy and the test results are reported in Table VI below.

EXAMPLE 16

To 217 grams of a 10% bromine-containing unsaturated polyester prepolymer based upon tetrabromophthalic anhydride was added 13 grams of 3,9-bis(N,N-diethylamino)-2,4,8,10-tetraoxa-3,9-diphosphaspiro[5.5]undecane-3,9-dioxide, 0.5 gram of cobalt naphthenate and 1 gram of methyl ethyl ketone peroxide. A glass fiber laminate was prepared as in Example 14 to provide a polymeric composition containing 23% by weight glass fiber. The flame retardant additive was present in a concentration of six parts per hundred parts of resin. The composition was tested to measure its flame retardancy and the test results were compared with flame retardancy measurements made on the same polyester without the flame retardant additive. Results are reported in Table VI below.

The Oxygen Index reported above is a test designed to measure the percentage of oxygen in an atmosphere necessary to support combustion of the material being tested. Generally speaking, a material with an Oxygen Index of 21.0 is considered flammable under ordinary conditions whereas a material with a higher Oxygen Index possesses some degree of flame retardancy. The procedure for conducting the Oxygen Index test is reported in ASTM D-2863-70.

The test designated "HLT-15" is a flammability test developed by Hooker Chemical Corporation to measure the flammability of a specimen suspended in a vertical position and exposed to a flame for increasing increments of time. The degree of flammability is measured on a scale of 100 units with 0 indicating the most flame retardant condition measurable. The procedure for the HLT-15 test is reported by A. J. Hammerl, "Burning Tests for Thermosetting Resins", 17th SPI, Reinforced Plastics Division, Section 12H, pages 1 to 6, February 1962.

The data in Table VI show that the compounds described herein are capable of producing measurable flame retardancy in polyester resins. And not only is the flame retardancy measurable, but the level of flame retardancy is sufficient to be of significant commercial interest. The significance of the flame retardancy attained by polyester compositions with in the scope of this invention can be recognized by comparing their flame retardancy values of the same polyester resins modified with tris(2,3-dibromopropyl)phosphate, a widely used commercially available flame retardant for polyesters.

EXAMPLE 17

To 90 parts by weight of crystalline polystyrene (Union Carbide SMD-3500) was added 10 parts of 3,9-bis(2,3-dibromopropoxy)-2,4,8,10-tetraoxa-3,9-diphosphaspiro[5.5]undecane-3,9-dioxide and the resultant mixture mixed in a Brabender mixer and subsequently compression molded at 400° F. for five minutes at 578 psi followed by a temperature decreasing from 400° F. to 200° F. over a ten minute period. The finished composition contained 10% by weight of the flame retardant additive. The composition was tested to measure its flame retardancy and the test results compared with flame retardancy measurements on unmodified polystyrene and on polystyrene to which tris (2,3-dibromopropyl)phosphate had been added. Results are reported in Table VII below.

siloxane and an alkylene oxide (Union Carbide L-540) as a surfactant, 0.35 gram of triethylene diamine (Dabco 33-LV) as a catalyst, 0.23 gram of stannous 2-ethylhexanoate as a catalyst and 30 grams of deionized water as a blowing agent. The ingredients were mixed until an even dispersion was obtained, at which time 38.1 grams of an 80/20 blend of 2,4- and 2,6-toluenediisocyanate was added with rapid mixing for a few seconds and then transferred to a mold where the foam was allowed to form. the foamed polyurethane product was cured at 100° C. for 15 minutes.

A control composition containing all of the above ingredients except the flame retardant was prepared in a manner identical to the above preparation.

The compositions were tested for flame retardancy by measuring their Oxygen Indexes. Results are reported in Table VIII below.

EXAMPLE 19

Three polyurethane compositions were prepared using the procedure of Example 18 except that instead of 10 grams of the flame retardant specified in Example 18, quantities of 10, 20 and 30 grams of 3,9-bis(N-p-bromophenylamino)-2,4,8,10-tetraoxa-3,9-diphosphaspiro[5.5]undecane-3,9-dioxide were used to pre-

TABLE VI

| Example Number | Polymer Type | Flame Retardant Type | Flame Retardant, phr | Synergist, phr | Glass, % weight | Oxygen Index | HLT-15 |
|---|---|---|---|---|---|---|---|
| 14 | General Purpose Polyester | 3,9-bis(2,2-dibromomethyl)-3-chloro propoxy-etc.* | 27 | 6.4 | 24 | 28.0 | 52 |
| 15 | General Purpose Polyester | 3,9-bis(N,N-diethylamino)-etc.* | 10 | 0 | 22 | 23.0 | 0 |
|  | General Purpose Polyester | None | 0 | 0 | 24 | 19.5 | 0 |
|  | General Purpose Polyester | tris(2,3-dibromopropyl)phosphate | 10 | 0 | 24 | 23.5 |  |
| 16 | Brominated Polyester | 3,9-bis(N,N-diethylamino)-etc.* | 6 | 0 | 23 | 32.0 | 64 |
|  | Brominated Polyester | None | 0 | 0 | 23 | 26.3 | 12 |
|  | Brominated Polyester | tris(2,3-dibromopropyl)phosphate | 6 | 0 | 23 | 31.3 | 56 |

*etc. = 2,4,8,10-tetraoxa-3,9-diphosphaspiro[5.5]undecane-3,9-dioxide.

TABLE VII

| Example Number | Polymer Type | Flame Retardant | Flame Retardant, % weight | Oxygen Index |
|---|---|---|---|---|
| 17 | Polystyrene | 2,3-dibromopropoxy-etc.* | 10 | 26.5 |
|  | Polystyrene | None | 0 | 18.5 |
|  | Polystyrene | tris(2,3-dibromopropyl)-phosphate | 10 | 28.5 |

*etc. = 2,4,8,10-tetraoxa-3,9-diphosphaspiro-[5.5]undecane-3,9-dioxide.

EXAMPLE 18

To 100 grams of a polyoxypropylene triol having an average molecular weight of 3000 was added 10 grams of 3,9-bis(N,N-diethylamino)-2,4,8,10-tetraoxa-3,9-diphosphaspiro[5.5]undecane-3,9-dioxide as a flame retardant, one gram of a block copolymer of dimethyl pare the compositions. For comparative purposes three additional polyurethane compositions were prepared using, instead of the flame retardant specified above, the same quantities of a commercially available flame retardant customarily used in polyurethanes, tris(2,3-dibromopropyl)phosphate. Results are reported in Table VIII below.

A study of the data presented in Table VIII shows that the effectiveness of the flame retardants of both Examples 18 and 19 at the low level of 10 parts per 100 parts of polyol is noteworthy, particularly since the flame retardancy is achieved with a bromine concentration which is, in the case of Example 18, non-existent and in the case of Example 19, is far less than the bromine content of tris(2,3-dibromopropyl)phosphate-modified polyurethanes.

Based on this disclosure, many other modifications and ramifications will naturally suggest themselves to those skilled in the art. These are intended to be comprehended as within the scope of this invention.

TABLE VIII

| Example Number | Polymer Type | Flame Retardant | Flame Retardant, Parts per 100 parts of polyol | Oxygen Index |
|---|---|---|---|---|
| 18 | Polyurethane | 3,9-bis(N,N-diethyl-amino)-etc.* | 10 | 24.0 |
| 19 | Polyurethane | 3,3-bis(N-p-bromo-phenylamino)-etc.* | 10 | 23.0 |
| 19 | Polyurethane | 3,9-bis(N-p-bromo-phenylamino)-etc.* | 20 | 24.0 |
| 19 | Polyurethane | 3,9-bis(N-p-bromo-phenylamino) etc.* | 30 | 24.5 |
|  | Polyurethane | tris(2,3-dibromopropyl)-phosphate | 10 | 24.0 |
|  | Polyurethane | tris(2,3-dibromopropyl)-phosphate | 20 | 27.5 |
|  | Polyurethane | tris(2,3-dibromopropyl)-phosphate | 30 | 30.5 |
|  | Polyurethane | None | 0 | 19.0 |

*etc. = 2,4,8,10-tetraoxa-3,9-diphosphaspiro[5.5]undecane-3,9-dioxide.

The embodiments of the invention in which an exclusive property or privilege is claimed are defined as follows:

1. A polymeric composition comprising a polymer and a flame retarding amount of a compound of the formula

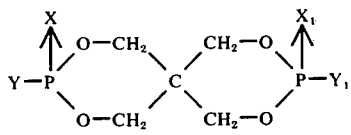

where X and $X_1$ are each oxygen or sulfur and Y and $Y_1$ are each

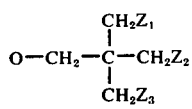

wherein $Z_1$ and $Z_2$ are independently selected from fluorine, chlorine, bromine, iodine, and hydrogen and wherein $Z_3$ is is selected from fluorine, chlorine, bromine, and iodine.

2. A polymeric composition according to claim 1 wherein X and $X_1$ are both oxygen.

3. A polymeric composition according to claim 1 wherein $Z_1$, $Z_2$, and $Z_3$ are independently selected from chlorine and bromine.

4. A polymeric composition according to claim 1 wherein said compound is 3,9-bis(2,2-di[bromomethyl]-3-chloropropoxy)-2,4,8,10-tetraoxa-3,9-diphosphaspiro[5.5]undecane-3,9-dioxide.

5. A polymeric composition according to claim 1 wherein said polymer is selected from the group consisting of polyolefin, acrylonitrile-butadiene-styrene copolymer, polyurethane, including foamed polyurethane, polystyrene, polyester, including saturated and unsaturated polyester, and cellulosic polymer-polyester blend.

6. A polymeric composition according to claim 5 wherein X and $X_1$ are both oxygen.

7. A polymeric composition according to claim 5 wherein $Z_1$, $Z_2$, and $Z_3$ are independently selected from chlorine and bromine.

8. A polymeric composition according to claim 6 wherein said compound is 3,9-bis(2,2-di[bromomethyl]-3-chloropropoxy)-2,4,8,10-tetraoxa-3,9-diphosphaspiro[5.5]undecane-3,9-dioxide.

9. A polymeric composition according to claim 1 wherein said polymer is a polypropylene.

10. A polymeric composition according to claim 1 wherein said polymer is a polyurethane.

11. A process for preparing a flame retardant polymer comprising combining said polymer with a flame retarding amount of a compound of the formula

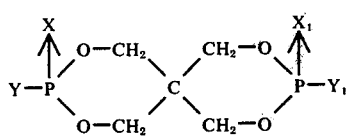

where X and $X_1$ are each oxygen or sulfur and Y and $Y_1$ are each

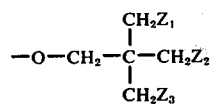

wherein $Z_1$ and $Z_2$ are independently selected from fluorine, chlorine, bromine, iodine and hydrogen and wherein $Z_3$ is selected from fluorine, chlorine, bromine, and iodine.

12. A process for preparing a flame retardant polymer according to claim 11 wherein X and $X_1$ are both oxygen.

13. A process for preparing a flame retardant polymer according to claim 11 wherein $Z_1$, $Z_2$, and $Z_3$ are independently selected from chlorine and bromine.

14. A process for preparing a flame retardant polymer according to claim 11 wherein said compound is 3,9-bis(2,2di-[bromomethyl]-3-chloropropoxy)-2,4,8,10-tetraoxa-3,9-diphosphaspiro[5.5]undecane-3,9-dioxide.

15. A process for preparing a flame retardant polymer according to claim 11 wherein said polymer is selected from the group consisting of polyolefin, acrylonitrile-butadiene-styrene copolymer, polyurethane, including foamed polyurethane, polystyrene, polyester, including saturated and unsaturated polyester, and cellulosic polymer-polyester blend.

16. A process for preparing a flame retardant polymer according to claim 15 wherein X and $X_1$ are both oxygen.

17. A process for preparing a flame retardant polymer according to claim 15 wherein $Z_1$, $Z_2$, and $Z_3$ are independently selected from chlorine and bromine.

18. A process for preparing a flame retardant polymer according to claim 15 wherein said compound 3,9-bis(2,2-di-[bromomethyl]-3-chloropropoxy)-2,4,8,10-tetraoxa-3,9-diphosphaspiro[5.5]undecane-3,9-dioxide.

19. A process for preparing a flame retardant polymer according to claim 11 wherein said polymer is polypropylene.

20. A process for preparing a flame retardant polymer according to claim 11 wherein said polymer is polyurethane.

21. A polymeric composition comprising a polymer and a flame retarding amount of a compound of the formula

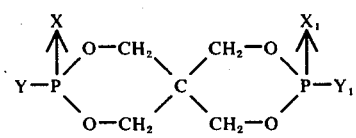

where X and $X_1$ are each oxygen or sulfur and Y and $Y_1$ are each

where R and $R_1$ are each monovalent hydrocarbon or halogenated monovalent hydrocarbon.

22. A polymeric composition according to claim 21 wherein X and $X_1$ are both oxygen.

23. A polymeric composition according to claim 21 where R and $R_1$ are each aliphatic, halogenated aliphatic, aromatic, or halogenated aromatic hydrocarbon groups containing not more than about 12 carbon atoms, said halogenated groups having up to about 6 substituents per group.

24. A polymeric composition according to claim 23 wherein the halogen substituents on said halogenated groups are chlorine, bromine, or combinations thereof.

25. A polymeric composition according to claim 21 wherein said compound is 3,9-bis(N,N-diethylamino)-2,4,8,10-tetraoxa-3,9-diphosphaspiro[5.5]undecane-3,9-dioxide.

26. A polymeric composition according to claim 21 wherein said compound is 3,9-bis(N,N-dimethylamio)-2,4,8,10-tetraoxa-3,9-diphosphaspiro[5.5]undecane-3,9-dioxide.

27. A polymeric composition according to claim 21 wherein said polymer is selected from the group consisting of polyolefin, acrylonitrile-butadiene-styrene copolymer, polyurethane, including foamed polyurethane, polystyrene, polyester, including saturated and unsaturated polyester, and cellulosic polymer-polyester blend.

28. A polymeric composition according to claim 27 where R and $R_1$ are each aliphatic, halogenated aliphatic, aromatic or halogenated aromatic hydrocarbon groups containing not more than about 12 carbon atoms, said halogenated groups having up to about 6 substituents per group.

29. A polymeric composition according to claim 28 wherein the halogen substituents on said halogenated groups are chlorine, bromine, or combinations thereof.

30. A polymeric composition according to claim 27 wherein said compound is 3,9-bis(N,N-diethylamino)-2,4,8,10-tetraoxa-3,9-diphosphaspiro[5.5]undecane-3,9-dioxide.

31. A polymeric composition according to claim 27 wherein said compound is 3,9-bis(N,N-dimethylamino)-2,4,8,10-tetraoxa-3,9-diphosphaspiro[5.5]undecane-3,9-dioxide.

32. A polymeric composition according to claim 21 wherein said polymer is a polyurethane.

33. A process for preparing a flame retardant polymer comprising combining said polymer with a flame retardant amount of a compound of the formula

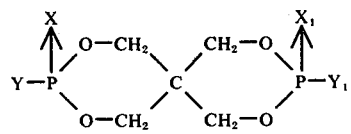

where X and $X_1$ are each oxygen or sulfur and Y and $Y_1$ are each

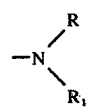

where R and $R_1$ are each monovalent hydrocarbon or halogenated monovalent hydrocarbon.

34. A process for preparing a flame retardant polymer according to claim 33 wherein X and $X_1$ are both oxygen.

35. A process for preparing a flame retardant polymer according to claim 33 where R and $R_1$ are each aliphatic, halogenated aliphatic, aromatic, or halogenated aromatic hydrocarbon groups containing not more than about 12 carbon atoms, said halogenated groups having up to about 6 halogen substituents per group.

36. A process for preparing a flame retardant polymer according to claim 35 wherein the halogen substituents are chlorine, bromine, or combinations thereof.

37. A process for preparing a flame retardant polymer according to claim 33 wherein said compound is 3,9-bis(N,N-diethylamino)-2,4,8,10-tetraoxa-3,9-diphosphaspiro[5.5]undecane-3,9-dioxide.

38. A process for preparing a flame retardant polymer according to claim 33 wherein said compound is 3,9-bis(N,N-dimethylamino)-2,4,8,10-tetraoxa-3,9-diphosphaspiro[5.5]undecane-3,9-dioxide.

39. A process for preparing a flame retardant polymer according to claim 33 wherein said polymer is selected from the group consisting of polyolefin, acrylonitrile-butadiene-styrene copolymer, polyurethane, including foamed polyurethane, polystyrene, polyester, including saturated and unsaturated polyester, and cellulosic polymer-polyester blend.

40. A process for preparing a flame retardant polymer according to claim 39 wherein X and $X_1$ are both oxygen.

41. A process for preparing a flame retardant polymer according to claim 39 where R and $R_1$ are each aliphatic, halogenated aliphatic, aromatic, or halogenated aromatic hydrocarbon groups containing not more than about 12 carbon atoms, said halogegroups having up to about 6 halogen substituents per group.

42. A process for preparing a flame retardant polymer according to claim 39 wherein the halogen substituents are chlorine, bromide, or combinations thereof.

43. A process for preparing a flame retardant polymer according to claim 39 wherein said compound is 3,9-bis-(N,N-diethylamino)-2,4,8,10-tetraoxa-3,9-diphosphaspiro [5.5]undecane-3,9-dioxide.

44. A process for preparing a flame retardant polymer according to claim 39 wherein said compound is 3,9-bis(N,N-dimethylamino)-2,4,8,10-tetraoxa-3,9-diphosphaspiro [5.5]undecane-3,9-dioxide.

45. A process for preparing a flame retardant polymer according to claim 34 wherein said polymer is a polyurethane.

46. A polymeric composition comprising a polymer and a flame retarding amount of a compound of the formula

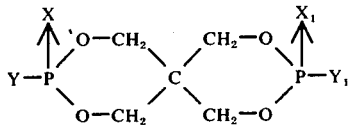

where X and X₁ are each oxygen or sulfur and Y and Y₁ are each

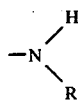

where R is an hydrogen, monovalent hydrocarbon or a halogenated monovalent hydrocarbon.

47. A polymeric composition according to claim 46 wherein X and X₁ are both oxygen.

48. A polymeric composition according to claim 46 where R is hydrogen or an aliphatic, halogenated aliphatic, aromatic, or halogenated aromatic hydrocarbon group containing not more than about 12 carbon atoms, said halogenated groups having up to about 6 substituents per group.

49. A polymeric composition according to claim 46 wherein said compound is 3,9-bis(amino)-2,4,8,10-tetraoxa-3,9-diphosphaspiro[5.5]undecane-3,9-dioxide.

50. A polymeric composition according to claim 46 wherein said polymer is selected from the group consisting of polyolefin, acrylonitrile-butadiene-styrene copolymer, polystyrene, polyester, including saturated and unsaturated polyester, and cellulosic polymer-polyester blend.

51. A polymeric composition according to claim 50 where R is hydrogen or an aliphatic, halogenated aliphatic, aromatic, or halogenated aromatic hydrocarbon group containing not more than about 12 carbon atoms, said halogenated group having up to about 6 substituents per group.

52. A polymeric composition according to claim 51 wherein said compound is 3,9-bis(amino)-2,4,8,10-tetraoxa-3,9-diphosphaspiro [5.5]undecane-3,9-dioxide.

53. A polymeric composition according to claim 46 wherein said polymer is a polyurethane.

54. A process for preparing a flame retardant polymer comprising combining said polymer with a flame retarding amount of a compound of the formula

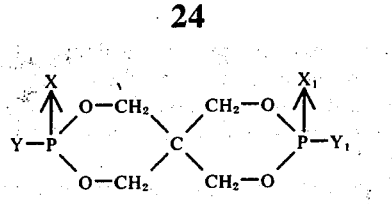

where X and X₁ are each oxygen or sulfur and Y and Y₁ are each

where R is an hydrogen, monovalent hydrocarbon or halogenated monovalent hydrocarbon.

55. A process for preparing a flame retardant polymer according to claim 54 wherein X and X₁ are both oxygen.

56. A process for preparing a flame retardant polymer according to claim 54 where R is hydrogen or an aliphatic, halogenated aliphatic, aromatic, or halogenated aromatic hydrocarbon group containing not more than about 12 carbon atoms, said halogenated group having up to about 6 halogen substituents per group.

57. A process for preparing a flame retardant polymer according to claim 54 wherein said compound is 3,9-bis(amino)-2,4,8,10-tetraoxa-3,9-diphosphaspiro [5.5]undecane-3,9-dioxide.

58. A process for preparing a flame retardant polymer according to claim 54 wherein said polymer is selected from the group consisting of polyolefin, acrylonitrile-butadiene-styrene copolymers, polystyrene, polyester including saturated and unsaturated polyester, and cellulosic polymer-polyester blend.

59. A process for preparing a flame retardant polymer according to claim 58 wherein X and X₁ are both oxygen.

60. A process for preparing a flame retardant polymer according to claim 58 where R is hydrogen or an aliphatic, halogenated aliphatic, aromatic, or halogenated aromatic hydrocarbon group containing not more than about 12 carbon atoms, said halogenated group having up to about 6 halogen substituents per group.

61. A process for preparing a flame retardant polymer according to claim 58 wherein said compound is 3,9-bis(amino)-2,4,8,10-tetraoxa-3,9-diphosphaspiro [5.5]undecane-3,9-dioxide.

62. A process for preparing a flame retardant polymer according to claim 54 wherein said polymer is polyurethane.

63. A polymeric composition according to claim 47 wherein said polymer is polyester.

64. A polymeric composition according to claim 5 wherein said compound is 3,9-bis(2,2-[dibromomethyl]-3-bromopropoxy)-2,4,8,10-tetraoxa-3,9-diphosphaspiro [5.5]undecane-3,9-dioxide.

65. A polymeric composition according to claim 64 wherein said polymer is polypropylene, polyethylene, and copolymers thereof.

66. A polymeric composition according to claim 64 wherein said polymer is polybutylene terephthalate.

67. A polymeric composition according to claim 5 wherein said compound is 3,9-bis(2,2-[dichloromethyl]-3-chloropropoxy)-2,4,8,10-tetraoxa-3,9-diphosphaspiro [5.5]undecane-3,9dioxide.

68. A polymeric composition according to claim 5 wherein said compound is 3,9-bis(2,2-[dimethyl]-3-chloropropoxy)-2,4,8,-10-tetraoxa-3,9-diphosphaspiro[5.5]-undecane-3,9-dioxide.

69. A polymeric composition according to claim 5 wherein said compound is 3,9-bis(2,2-[dimethyl]-3-bromopropoxy)-2,4,8,10-tetraoxa-3,9-diphosphaspiro [5.5] undecane-3,9-dioxide.

70. A polymeric composition according to claim 5 wherein said compound is 3,9-bis(2,2-[dibromomethyl]-3-chloropropoxy)-2,4,8,10-tetraoxa-3,9-diphosphaspiro [5.5]undecane-3,9-dioxide.

71. A polymeric composition according to claim 70 wherein said polymer is polypropylene, polyethylene, and copolymers thereof.

72. A process for preparing a flame retardant polymer according to claim 15 wherein said compound is 3,9-bis(2,2-[dibromomethyl]-3-bromopropoxy)-2,4,8,10-tetraoxa-3,9-diphosphaspiro [5.5]undecane-3,9-dioxide.

73. A process for preparing a flame retardant polymer according to claim 72 wherein said polymer is polypropylene, polyethylene, and copolymers thereof.

74. A process for preparing a flame retardant polymer according to claim 72 wherein said polymer is polybutylene terephthalate.

75. A process for preparing a flame retardant polymer according to claim 15 where said compound is 3,9-bis(2,2-[dichloromethyl]-3-chloropropoxy)-2,4,8,10-tetraoxa-3,9-diphosphaspiro [5.5]undecane-3,9-dioxide.

76. A process for preparing a flame retardant polymer according to claim 15 wherein said compound is 3,9-bis(2,2-[dimethyl]-3-chloropropoxy)-2,4,8,10-tetraoxa-3,9-diphosphaspiro-[5.5]undecane-3,9-dioxide.

77. A process for preparing a flame retardant polymer according to claim 15 wherein said compound is 3,9-bis(2,2-[dimethyl]-3-bromopropoxy)-2,4,8,10-tetraoxa-3,9-diphosphaspiro-[5.5]undecane-3,9-dioxide.

78. A process for preparing a flame retardant polymer according to claim 15 wherein said compound is 3,9-bis(2,2-[dibromomethyl]-3-chloropropoxy)-2,4,8,10-tetraoxa-3,9-diphosphaspiro [5.5]undecane-3,9-dioxide.

79. A process for preparing a flame retardant polymer according to claim 78 wherein said polymer is polypropylene, polyethylene, and copolymers thereof.

* * * * *